(12) United States Patent
McCullough et al.

(10) Patent No.: US 12,297,108 B2
(45) Date of Patent: May 13, 2025

(54) AMMONIA DECOMPOSITION CATALYST SYSTEMS

(71) Applicant: UNIVERSITY OF SOUTH CAROLINA, Columbia, SC (US)

(72) Inventors: Katherine McCullough, Lexington, SC (US); Jochen Lauterbach, Columbia, SC (US)

(73) Assignee: UNIVERSITY OF SOUTH CAROLINA, Columbia, SC (US)

(*) Notice: Subject to any disclaimer, the term of this patent is extended or adjusted under 35 U.S.C. 154(b) by 0 days.

(21) Appl. No.: 18/538,049

(22) Filed: Dec. 13, 2023

(65) Prior Publication Data

US 2024/0132348 A1  Apr. 25, 2024

Related U.S. Application Data

(62) Division of application No. 16/376,158, filed on Apr. 5, 2019, now Pat. No. 11,891,301.

(Continued)

(51) Int. Cl.
*C01B 3/04* (2006.01)
*B01J 8/00* (2006.01)
(Continued)

(52) U.S. Cl.
CPC .............. *C01B 3/047* (2013.01); *B01J 8/009* (2013.01); *B01J 23/462* (2013.01); *B01J 23/58* (2013.01);
(Continued)

(58) Field of Classification Search
None
See application file for complete search history.

(56) References Cited

U.S. PATENT DOCUMENTS 3,451,783 A * 6/1969 Collins .................. C01B 3/047
422/111
5,451,386 A * 9/1995 Collins ................ B01D 53/228
423/658.2
(Continued)

FOREIGN PATENT DOCUMENTS

CN  1506300 A  *  6/2004
GB  1039381 A  *  8/1966
(Continued)

OTHER PUBLICATIONS

Baumes, et al. "Support vector machines for predictive modeling in heterogeneous catalysis: A comprehensive introduction and overfitting investigation based on two real applications" *J. Comb. Chem.* 8 (2006) pp. 583-596.

(Continued)

*Primary Examiner* — Jennifer A Leung
(74) *Attorney, Agent, or Firm* — DORITY & MANNING, P.A.

(57) ABSTRACT

In general, disclosed herein are methods for forming hydrogen by use of an ammonia decomposition catalyst system. For instance, a method can include contacting a catalyst system with an ammonia source at a temperature of about 450° C. or lower. The catalyst systems can include a support material and a trimetallic catalyst component carried on the support material and within a reactor. Disclosed catalyst systems can decompose ammonia at relatively low temperatures and can provide an efficient and cost-effective route to utilization of ammonia as a carbon-free hydrogen storage and generation material.

14 Claims, 9 Drawing Sheets

Related U.S. Application Data

(60) Provisional application No. 62/720,356, filed on Aug. 21, 2018.

(51) Int. Cl.
  *B01J 23/46* (2006.01)
  *B01J 23/58* (2006.01)

(52) U.S. Cl.
  CPC ........ *B01J 2523/12* (2013.01); *B01J 2523/13* (2013.01); *B01J 2523/14* (2013.01); *B01J 2523/15* (2013.01); *B01J 2523/25* (2013.01); *B01J 2523/36* (2013.01); *B01J 2523/49* (2013.01); *B01J 2523/821* (2013.01); *C01B 2203/041* (2013.01); *C01B 2203/066* (2013.01); *C01B 2203/1041* (2013.01); *C01B 2203/1064* (2013.01); *C01B 2203/1094* (2013.01)

(56) References Cited

U.S. PATENT DOCUMENTS

| | | | |
|---|---|---|---|
| 6,630,116 | B2 | 10/2003 | Balachandran et al. |
| 8,347,645 | B1 | 1/2013 | Miller |
| 8,962,518 | B2 | 2/2015 | Okamura et al. |
| 9,493,349 | B2 | 11/2016 | Varma et al. |
| 9,580,309 | B2 | 2/2017 | Araki et al. |
| 2002/0028171 | A1* | 3/2002 | Goetsch ............... B01J 23/745 429/513 |
| 2013/0156687 | A1 | 6/2013 | Araki et al. |
| 2014/0356738 | A1* | 12/2014 | Bell ................. H01M 8/0662 429/411 |
| 2015/0010835 | A1 | 1/2015 | Varma et al. |

FOREIGN PATENT DOCUMENTS

| | | | |
|---|---|---|---|
| JP | 10085601 | A * | 4/1998 |
| JP | 2010-269239 | | 12/2010 |
| JP | 2013095618 | A * | 5/2013 |
| JP | 2016-198720 | | 12/2016 |
| JP | 2017-001010 | | 1/2017 |
| JP | 2017-124366 | | 7/2017 |
| SU | 594994 | A * | 3/1978 |

OTHER PUBLICATIONS

Boisen, et al. "Why the optimal ammonia synthesis catalyst is not the optimal ammonia decomposition catalyst" *J. Catal.* 230 (2005) pp. 309-312.
Breiman, L. "Random forests" *Mach. Learn.* 45 (2001) pp. 5-32.
Dahl, et al. "Dissociative adsorption of N2 on Ru(0001): A surface reaction totally dominated by steps" *J. Catal.* 192 (2000) pp. 381-390.
Di Carlo, et al. "Ammonia decomposition over commercial Ru/Al$_2$O$_3$catalyst: An experimental evaluation at different operative pressures and temperatures" *Int. J. Hydrogen Energy* 39 (2014) pp. 808-814.
Ganley, et al. "A priori catalytic activity correlations: the difficult case of hydrogen production from ammonia" *Catal. Letters* 96 (2004) pp. 117-122.
Guo, et al. "Patched bimetallic surfaces are active catalysts for ammonia decomposition" *Nat. Commun.* 6 (2015) pp. 1-7.
Hansen, et al. "Assessment and validation of machine learning methods for predicting molecular atomization energies" *J. Chem. Theory Comput.* 9 (2013) pp. 3404-3419.
Hattrick-Simpers, et al. "The materials super highway: Integrating high-throughput experimentation into mapping the catalysis materials genome" *Catal. Letters* 145 (2015) pp. 290-298.
Hendershot, et al. "High-throughput heterogeneous catalytic science" *Chem. A Eur. J.* 11 (2005) pp. 806-814.
Hendershot, et al. "A novel reactor system for high throughput catalyst testing under realistic conditions" *Appl. Catal. A* 254 (2003) pp. 107-120.
Hill, et al. "Low temperature H$_2$ production from ammonia using ruthenium-based catalysts: Synergetic effect of promoter and support" *Appl. Catal. B Environ.* 172-173 (2015) pp. 129-135.
Hill, et al. "In-situ H$_2$ production via low temperature decomposition of ammonia: Insights into the role of cesium as a promoter" *Int. J. Hydrogen Energy* 39 (2014) pp. 7646-7654.
Hu, et al. "Ru-Based Catalysts for H2 Production from Ammonia: Effect of 1D Support" *Top. Catal.* 1 (2018) pp. 1-3.
Jacobsen, et al. "Catalyst design by interpolation in the periodic table: Bimetallic ammonia synthesis catalysts" *J. Am. Chem. Soc.* 123 (2001) pp. 8404-8405.
Jacobsen, et al. "Structure sensitivity of supported ruthenium catalysts for ammonia synthesis" *J. Mol. Catal. A Chem.* 163 (2000) pp. 19-26.
Kitchin, J.R. "Machine learning in catalysis" *Nat. Catal.* 1 (2018) pp. 230-232. (Abstract only).
Klanner, et al. "How to design diverse libraries of solid catalysts" *QSAR Comb. Sci.* 22 (2003) pp. 729-736.
Lamb, et al. "Ammonia for hydrogen storage; A review of catalytic ammonia decomposition and hydrogen separation and purification" *Int. J. Hydrogen Energy* 44 (2019) pp. 3580-3593.
Li, et al. "Feature engineering of machine-learning chemisorption models for catalyst design" *Catal. Today* 280 (2017) pp. 232-238.
Li, et al. "High-throughput screening of bimetallic catalysts enabled by machine learning" *J. Mater. Chem. A* 5 (2017) pp. 24131-24138.
Medford, et al. "Extracting Knowledge from Data through Catalysis Informatics" *ACS Catal.* 8 (2018) pp. 7403-7429.
Medford, et al. "From the Sabatier principle to a predictive theory of transition-metal heterogeneous catalysis" *J. Catal.* 328 (2015) pp. 36-42.
Mittasch, et al. "Early studies of multicomponent catalysts" *Adv. Catal.* 2 (1950) pp. 81-104. (Abstract only).
Mukherjee, et al. "Low-temperature ammonia decomposition catalysts for hydrogen generation" *Appl. Catal. B Environ.* 226 (2018) pp. 162-181.
Pyrz, et al. "Characterization of K-promoted Ru catalysts for ammonia decomposition discovered using high-throughput experimentation" *Top. Catal.* 50 (2008) pp. 180-191.
Raccuglia, et al. "Machine-learning-assisted materials discovery using failed experiments" *Nature* 533 (2016) pp. 73-76.
Rodemerck, et al. "Application of a genetic algorithm and a neural network for the discovery and optimization of new solid catalytic materials" *Appl. Surf. Sci.* 223 (2004) pp. 168-174.
Sasmaz, et al. "High-throughput screening using Fourier-transform infrared imaging" *Engineering* 1 (2015) pp. 234-242.
Tsai, et al. "Steady-State Decomposition of Ammonia on the Ru (001)" *Surface. J . Phys. Chem.* 91 (1987) pp. 5302-5307.
Ulissi, et al. "To address surface reaction network complexity using scaling relations machine learning and DFT calculations" *Nat. Commun.* 8 (2017) pp. 1-7.
Ward, et al. "A general-purpose machine learning framework for predicting properties of inorganic materials" *NPJ Comput. Mater.* 2:16028 (2016) pp. 1-7.
Wolf, et al. "Identifying lead hits in catalyst discovery by screening and deconvoluting complex mixtures of catalyst components" *Chem. Sci.* 6 (2015) pp. 2501-2505.
Yin, et al. "Investigation on the catalysis of COx-free hydrogen generation from ammonia" *J. Catal.* 224 (2004) pp. 384-396.
Zahrt, et al. "Prediction of higher-selectivity catalysts by computer-driven workflow and machine learning" *Science* 363(6424) (2019) pp. 1-25.
Zhang, et al. "A strategy to apply machine learning to small datasets in materials science" *NPJ Comput. Mater.* 4 (2018) pp. 28-33.

* cited by examiner

AMMONIA DECOMPOSITION CATALYST SYSTEMS

CROSS REFERENCE TO RELATED APPLICATION

This application is a Divisional Application of U.S. patent application Ser. No. 16/376,158, having a filing date of Apr. 4, 2019, which claims filing benefit of U.S. Provisional Patent Application Ser. No. 62/720,356, having a filing date of Aug. 21, 2018, all of which are incorporated herein by reference in its entirety.

FEDERAL RESEARCH STATEMENT

This invention was made with Government support under Grant No. DGE1250052 awarded by the National Science Foundation, and under Grant No. DE-AR0000931 awarded by the Department of Energy. The Government has certain rights in the invention.

BACKGROUND

Hydrogen has great potential as an alternative fuel source for vehicles and fuel cells. It is an attractive medium for the mobile conversion of chemical to electrical energy as it can provide delivery efficiencies between 50-60% when used in fuel cells. Hydrogen also boasts an energy density of 120 MJ/kg, as compared to gasoline's 44 MJ/kg. However, the delivery and transportation of hydrogen to mobile locations proves difficult due to the lack of infrastructure and the cost associated to either compress or liquefy hydrogen.

Ammonia offers great promise as a hydrogen storage and transportation material. It is attractive not only because it is a carbon-free molecule, but also because it has high hydrogen density and can be decomposed to produce hydrogen and nitrogen. Moreover, ammonia is easily liquefied and infrastructure for storage and transport already exists due to widespread ammonia use in the agricultural sector. For economically feasible hydrogen production from ammonia, however, it is necessary that the decomposition reaction be carried out at relatively low temperatures and high conversion, particularly if the decomposition and hydrogen production process is to be integrated into a fuel cell system (e.g., a polymer electrolyte membrane (PEM) fuel cell system).

What are needed in the art are materials and systems that can provide high purity hydrogen from an ammonia at a lower cost. Cost effective materials and methods could provide a route for the use of ammonia as a hydrogen source for many potential applications, and particularly for those using hydrogen as a fuel.

One high cost component of an ammonia decomposition process is the decomposition catalyst, which generally includes a catalytic noble metal (e.g., ruthenium) supported on a carrier (e.g., an alumina or zirconia). Accordingly, it would be greatly beneficial in the art to develop lower cost ammonia decomposition catalysts that provide high conversion at mild temperatures and over a wide range of pressures.

SUMMARY

According to one embodiment, disclosed is an ammonia decomposition reactor. The reactor includes an ammonia inlet, an ammonia decomposition catalyst system downstream of the ammonia inlet, a hydrogen outlet downstream of the catalyst system, and a nitrogen outlet downstream of the catalyst system. The ammonia decomposition catalyst system can include a catalyst component that includes at least one metal that catalyzes the ammonia decomposition and, optionally, includes one or more additional metals that catalyze and/or promote ammonia decomposition. A catalyst system can also include a support material (e.g., alumina, yttria, zirconia, etc.) for the catalyst component of the system.

In one embodiment, a catalyst component can include ruthenium and at least one additional metal that catalyzes and/or promotes the ammonia decomposition reaction. In one embodiment, the additional metal(s) can be selected from alkali metals, alkaline earth metals, transition metals, metalloids, post transition metals or any combination thereof. In one embodiment, the catalyst component can include ruthenium, a second metal that functions as an ammonia decomposition catalyst (e.g., hafnium or yttrium), and a third metal that functions as a catalyst promoter and/or an ammonia decomposition catalyst (e.g., an alkali metal or an alkaline earth metal). In other embodiments, the catalyst component can optionally include more than three metals.

According to one embodiment, the ammonia decomposition catalyst component of a catalyst system can include hafnium or yttrium. For instance, the catalyst component including hafnium or yttrium can be free of ruthenium, such as a monometallic or bimetallic hafnium or yttrium-based catalyst. In one embodiment, a hafnium or yttrium-based catalyst component can include at least one additional metal that can function as a catalyst promoter and/or as an additional catalytic material.

Also disclosed are methods for decomposing ammonia by use of the catalyst systems. For instance, a method can include contacting a catalyst system (including e.g., a bimetallic or promoted bimetallic ruthenium-based catalyst component, a hafnium-based catalyst component, or a yttrium-based catalyst component) with ammonia at a relatively low reaction temperature (e.g., about 450° C. or lower), a broad pressure range (e.g., up to about 5 bar), and at high ammonia input concentration (100% ammonia in some embodiments) and decomposing the ammonia to form hydrogen at a high conversion rate (e.g., about 95% conversion or higher).

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
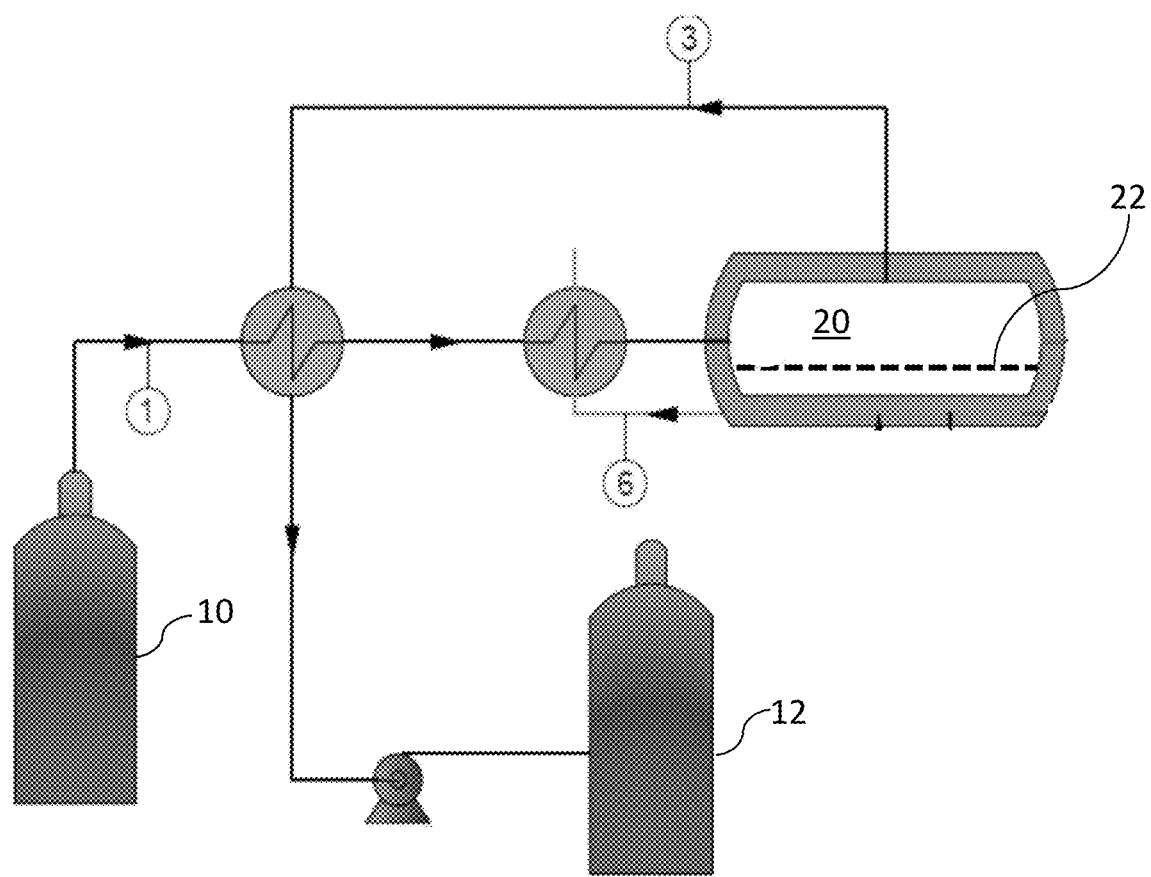
FIG. 1 schematically illustrates one embodiment of a reactor system as may incorporate disclosed catalysts.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

The present disclosure is generally directed to catalyst systems for use in ammonia decomposition that include a catalyst component and a support material. In one embodiment, disclosed catalyst systems include ruthenium-based catalyst components that include ruthenium as catalyst in combination with one or more additional catalytic and/or catalyst promoting metals. In another embodiment, disclosed catalyst systems include ruthenium-free catalyst components based upon hafnium or yttrium. The catalyst systems include a support material that can carry high quantities of the catalytic/promoter materials (i.e., the catalyst component). Beneficially, disclosed catalyst systems can decompose ammonia at relatively low temperatures and can provide an efficient and cost-effective route to utilization of ammonia as a carbon-free hydrogen storage and generation material.

As utilized herein, the term "catalyst promoter" (also referred to herein simply as a "promoter") generally refers to a material that exhibits little or no catalytic activity (i.e., less catalytic activity as compared to a primary catalytic material of the catalyst component such as ruthenium, hafnium, or yttrium), and that can increase the efficiency of the catalytic metals, for instance, by functioning as an electron donor to the system.

In a first embodiment, the catalyst systems can be ruthenium-based systems that include as catalyst component ruthenium and one or more additional metals, the additional metal(s) being capable of catalyzing ammonia decomposition and/or capable of promoting a catalyst metal. For instance, ruthenium-based catalyst systems can include bimetallic or trimetallic materials that can include lower quantities of ruthenium as compared to traditional ruthenium catalyst systems, so as to lower costs, but can also meet or exceed ammonia conversion capabilities of traditional systems, and can be highly effective at relatively low reaction temperatures, e.g., about 450° C. or lower, for instance from about 250° C. to about 450° C., from about 300° to about 450° C., from about 350° C. to about 450° C. or from about 400° C. to about 450° C., in some embodiments. Disclosed catalyst systems can also function effectively over a wide pressure range, for instance, up to about 5 bar, or from about 1 bar to about 5 bar, in some embodiments.

The additional metal(s) of a ruthenium-based catalyst system can be selected from alkali metals, alkaline earth metals, transition metals, metalloids, post transition metals, as well as combinations thereof. However, the additional metal(s) of the ruthenium-based catalyst systems are not limited to these metals, and in some embodiments, other catalyst-promoting and/or catalytic metals can be incorporated in the catalyst systems.

In one embodiment, the additional metal(s) can include potassium, sodium, magnesium, calcium, strontium, scandium, yttrium, titanium, zirconium, hafnium, vanadium, niobium, tantalum, chromium, molybdenum, tungsten, manganese, rhenium, iron, osmium, cobalt, rhodium, iridium, nickel, palladium, platinum, copper, silver, gold, zinc, cadmium, indium, tin, lead, lanthanum, bismuth, or any combination thereof. In one particular embodiment, the additional metal(s) can be selected from hafnium, potassium, magnesium, calcium, manganese, scandium, rhodium, strontium, and yttrium, or any combination thereof. In another embodiment, the additional metal(s) can be selected from hafnium, potassium, calcium, manganese, scandium, strontium, and yttrium, or any combination thereof.

When considering a bi-metallic ruthenium-based catalyst component, the two metals can be present in the catalyst component in any suitable weight ratio to one another. For instance, the catalyst component of the system can include ruthenium and a second metal in a weight ratio to one another of from about 1:99 to about 99:1; from about 90:1 to about 1:90; from about 1:50 to about 50:1; from about 10:1 to about 1:10; from about 9:1 to about 1:9; from about 1:8 to about 8:1; from about 5:1 to about 1:5; from about 1:3 to about 3:1; or in a 1:1 weight ratio, in some embodiments. By way of a specific non-limiting example, a bimetallic catalyst component can include ruthenium and a second metal (e.g., yttrium, manganese, iron, cobalt, etc.) in a 1:3 weight ratio or in a 1:1 weight ratio.

When considering the entire catalyst system, a bimetallic ruthenium-based system can generally include the ruthenium in an amount of up to about 15 wt. % of the catalyst system, for instance, from about 0.1 wt. % to about 15 wt. %; from about 0.5 wt. % to about 10 wt. %; or from 1 wt. % to about 7 wt. %; for instance, up to about 4 wt. % or less than 4 wt. % of the catalyst system, in some embodiments. A second metal can be present in the ruthenium-based system in an amount of up to about 30 wt. % of the catalyst system, for instance, from about 1 wt. % to about 30 wt. %; from about 5 wt. % to about 25 wt. %; or from about 5 wt. % to about 15 wt. %; for instance, about 13 wt. % of the catalyst system in some embodiments. Such bimetallic catalyst components can be highly effective, for instance, capable of exhibiting up to about 99% ammonia conversion at a relatively low reaction temperature of about 400° C.

Other examples of bimetallic ruthenium-based catalyst components are described in Table 1, below. In the below table, the weight percentage of ruthenium and the secondary metal in an exemplary catalyst system are described, but the catalyst systems are not in any way limited to these particular materials or these particular concentrations.

TABLE 1

| Wt. % Ru | Second metal | Wt. % second metal |
| --- | --- | --- |
| 4 | Ni | 1 |
| 4 | Co | 1 |
| 4 | La | 4 |

TABLE 1-continued

| Wt. % Ru | Second metal | Wt. % second metal |
|---|---|---|
| 4 | Ba | 4 |
| 4 | Ca | 4 |
| 4 | Na | 4 |
| 4 | Sr | 4 |
| 4 | Y | 4 |
| 4 | La | 10 |
| 4 | Mg | 4 |
| 4 | Na | 10 |
| 3 | Na | 10 |
| 2 | Na | 10 |

Ruthenium-based catalyst systems can also be formed that include three or more metals in the catalyst component, one of which being ruthenium and the other two selected in one embodiment from any combination of alkali metals, alkaline earth metals, transition metals, metalloids, or post transition metals. When considering a ruthenium-based catalyst system that includes three or more metals in the catalyst component, the ruthenium and the additional metals can generally be present in the catalyst component in any ratio. For example, any two of the metals can be present in the catalyst component in a ratio to each other of from about 1:99 to about 99:1; from about 90:1 to about 1:90; from about 1:50 to about 50:1; from about 10:1 to about 1:10; from about 9:1 to about 1:9; from about 1:8 to about 8:1; from about 5:1 to about 1:5; from about 1:3 to about 3:1; or in a 1:1 weight ratio, in some embodiments. For instance, a tri-metallic catalyst component can in one embodiment include each of the three metals in an amount of from about 0.1 wt. % to about 99.8 wt. % of the catalyst component of a system.

When considering the entire catalyst system, a trimetallic ruthenium-based system can generally include the ruthenium in an amount of up to about 10 wt. %; for instance, from about 0.1 wt. % to about 10 wt. %; from about 0.5 wt. % to about 7 wt. %; for instance, up to about 4 wt. % or less than 4 wt. % in some embodiments. A second metal can be present in the ruthenium-based system in an amount of up to about 20 wt. %; for instance, from about 1 wt. % to about 10 wt. %; from about 2 wt. % to about 8 wt. %; or from about 3 wt. % to about 7 wt. %; for instance, about 5 wt. % in some embodiments. A third metal can be present in the ruthenium-based system in an amount of up to about 30 wt. %; for instance, from about 1 wt. % to about 20 wt. %; from about 2 wt. % to about 15 wt. %; or from about 3 wt. % to about 10 wt. %; for instance, about 5 wt. % in some embodiments.

One example of a trimetallic ruthenium-based catalyst component can include ruthenium, sodium, and magnesium as catalytic/promoter materials, and the trimetallic catalyst system can include 3 wt. % ruthenium, 5 wt. % sodium, and 5 wt. % magnesium, in which case the catalyst component includes the three metals in a weight ratio of Ru:Na:Mg of 3:5:5. However, ruthenium-based catalyst components that include three or more metals are not limited to any particular secondary metals or any particular weight ratio between the three or more metals, and any metals as discussed above can be incorporated with ruthenium in the multi-metal ruthenium-based catalyst systems at any desired relative amount to one another.

In another embodiment, the ammonia decomposition catalyst systems can be ruthenium-free catalyst systems based upon hafnium or yttrium. For instance, one embodiment of disclosed catalyst systems can incorporate only hafnium or only yttrium as the only catalytic material of a catalyst component. However, in other embodiments, hafnium and yttrium-based catalyst systems can incorporate one or more additional metal(s) in the catalyst component, which can be selected from metals as described previously. By way of example, in one embodiment, a catalyst component can include both hafnium and yttrium as two catalytic materials and can be free of ruthenium.

When incorporating additional metal(s) in a hafnium or yttrium-based bimetallic catalyst component, the metals (one of which being hafnium or yttrium and the other being one or more additional catalytic and/or promoter metals as described previously) can generally be present in the catalyst component in a weight ratio of from about 1:9 to about 9:1. For instance, a bimetallic catalyst component can include the two metals in the catalyst component in a weight ratio of from about 1:9 to about 9:1, or from about 1:3 to about 3:1, or in a 1:1 ratio, in some embodiments. When forming a hafnium or yttrium-based catalyst component that includes two or more secondary metals, i.e., two or more additional catalytic and/or promoter metals in addition to at least one of hafnium and yttrium, the catalyst component can generally include each of the three or more metals in an amount of from about 10 wt. % to about 90 wt. % of the catalyst component of the catalyst system.

A secondary metal(s) of a catalyst component of a system can function as a catalytic metal and/or as a catalyst promoter. Metals that can provide promoter activity in a catalyst system can include alkali metals and alkaline earth metals, among others. In one embodiment, the catalyst component can include as promoter an alkali metal having an atomic number equal to or greater than 11, i.e. sodium, potassium, rubidium, or cesium. In another embodiment, strontium can be incorporated in a catalyst component as a promoter, which may also provide some catalytic activity to a catalyst system. Without wishing to be bound to any particular theory, secondary metals that are believed to provide activity as catalyst promoters, possibly also in conjunction with providing some catalytic activity in disclosed systems include, without limitation, sodium, lithium, rubidium, potassium, cesium, barium, strontium, calcium, and magnesium.

For effective activity promotion, a promoter can generally be included in the catalyst system in an amount that can assure that the promoter is very well dispersed over the support material and/or in close proximity to a catalytic metal so that the promoter can associate with a catalytic metal and enhance catalytic activity through electronic or structural promotion/enhancement of the active metal and thus the catalyst system. By way of example, when included, a promoter can generally be incorporated in a catalyst system in an amount up to about 30 wt. % of the catalyst system; for instance, from about 1 wt. % to about 30 wt. %; from about 5 wt. % to about 20 wt. %; from about 8 wt. % to about 15 wt. %; or about 12 wt. %, in some embodiments.

Disclosed catalyst systems can include the catalytic components in conjunction with support materials. In general, a catalyst system can include the catalytic components (i.e., the total amount of all catalytic metals and all promoter metals) in an amount of from about 1 wt. % to about 60 wt. % of the catalyst system; for instance, from about 2 wt. % to about 50 wt. %; from about 2 wt. % to about 40 wt. %; or about 35 wt. %, in some embodiments. For instance, in one embodiment, a catalyst system can include up to about 15 wt. % of one or more metals that provide activity as a promoter and up to about 10 wt. % (e.g., from about 2 wt. % to about 8 wt. % or about 4 wt. %) of one or more metals that provide catalytic activity, with the remainder of the catalyst system (e.g., about 75 wt. % of the system) being formed of support materials or other non-catalyst additive materials. In one embodiment, ruthenium-based catalyst systems can incorporate ruthenium in an amount of about 4 wt. % or less; for instance, about 3 wt. % or less such as from about 0.5 wt. % to about 3 wt. % of the catalyst system, and as such, can include lower amounts of ruthenium as are found in traditional ruthenium-based catalyst systems (which generally include ruthenium as 4 wt. % of the catalyst system).

In addition to the catalyst component (i.e., catalytic materials and optional promoters), the catalyst systems can include a support material, e.g., a porous support material, as carrier for the catalyst component that can retain the catalytic material in a high concentration over a high surface area. The support material can also retain the catalyst component in a highly dispersed state and prevent catalytic material from agglomerating, which can promote increased contact between the ammonia and the catalyst component. By way of example and without limitation, a support material can be selected from titania, yttria, ceria, zirconia, alumina, silica, activated carbon and any composite thereof.

In one embodiment, a support material can include an inorganic oxide including, without limitation, titania ($TiO_2$), yttria ($Y_2O_3$), ceria ($CeO_2$), zirconia ($ZrO_2$), silica ($SiO_2$), alumina ($Al_2O_3$) (e.g., $\gamma$-$Al_2O_3$ or $\alpha$-$Al_2O_3$), and a ceria-zirconia complex ($CeO_2$—$ZrO_2$). Utilization of an inorganic oxide as support material can be beneficial in one embodiment, as it can enhance decomposition activity of the catalyst component can improve the persistence of the decomposition activity of the system during long-term usage.

The content of the support material in the catalyst system can generally be about 40% by weight or more, for instance, from about 50 wt. % to about 98 wt. %, in some embodiments, though no particular amount of support material is required.

The support material can desirably have a high surface area, for instance, a BET specific surface area greater than about 5 $m^2/g$; for instance, from about 5 $m^2/g$ to about 1000 $m^2/g$, e.g., from about 10 $m^2/g$ to about 500 $m^2/g$; or from about 100 $m^2/g$ to about 250 $m^2/g$, in some embodiments.

In one embodiment, the support material can be in the form of a porous particulate (e.g., a zeolite) that can be impregnated or otherwise combined with the catalyst component. The size of the support material particles is not particularly limited, with a preferred size generally depending upon the characteristics of the particular reactor and application of the system to be used. In general, however, catalyst system support material particles can have an average particle size of about 0.1 μm or more, for instance from about 0.1 μm to about 200 μm, in order to provide a high contact surface area between ammonia and the catalyst component of the system. The average particle size can be determined as the average of the values obtained when at least 10 of the particles are measured for the major diameter using a standard measurement protocol, e.g., scanning electron microscopy.

The catalyst systems can be formed according to any standard method capable of locating the catalyst component on a surface of a support material (including pore surfaces). Methods can include, for example, impregnating a solution of the metal(s) of the catalyst component in the support material, immersing the support material in one or more solutions of the catalyst component, and adsorbing the metal(s) of the catalyst component on the support material. Impregnation methods can include, for example, incipient wetness impregnation or wet impregnation approaches, as are generally known in the art. Other formation techniques can include, without limitation, precipitation techniques, hydrothermal treatment techniques, and sol-gel formation techniques.

Multiple formation methods can be utilized to combine the materials of a system. For instance, a catalyst component can be combined with a support material by impregnation of a single solution including two (or more) catalytic/promoter metals or through sequential impregnation of multiple solutions, each containing one or more materials of the catalyst component of the system. For instance, different solutions (e.g., a first solution including one or more catalytic metal(s) and a second solution including one or more promoters) can be combined with the support material according to different approaches. For instance, a first solution including one or more catalytic metal(s) can be impregnated in a support material followed by adsorption of a promoter on the support material in a co-impregnation approach that can be simultaneous or sequential.

Metals can be combined with a support material as a solution of a metal salt including, without limitation, metal bromides, metal bromide hydrates, metal chlorides, metal chloride hydrates, metal iodides, metal nitrosyl nitrates, metal oxides, metal oxide hydrates, metal tetraoxides, metal nitrates, metal acetates, metal acetylacetonates, metal perchlorates and the like, as well as combinations thereof, utilizing any suitable solvent as would be known to one of skill in the art. For example, a potassium promoter can be combined with a support material by impregnation of the support material with a potassium salt solution (e.g., $K_2CO_3$, $KHCO_3$, $KNO_3$, $KCH_3O_2$, or KOH).

Organometallic compounds, such as tri-ruthenium dodecacarbonyl and ruthenium acetylacetonate, can be utilized as metal precursors in forming disclosed catalysts.

In addition, when considering a catalyst system that includes multiple metal compounds (e.g., a bimetallic ruthenium-based catalyst component), the various metals can be provided as one or more solutions of the same or different anions and/or one or more organometallic precursors, as desired.

Following formation, disclosed catalyst systems can be utilized in an ammonia decomposition reactor system to form hydrogen with high energy efficiency (e.g., about 80% or greater) and to deliver high purity (e.g., about 95% or greater) $H_2$ from $NH_3$ decomposition at low temperature (e.g., about 450° C. or lower) and high conversion (greater than about 95% in some embodiments).

By way of example, FIG. 1 schematically illustrates one embodiment of a hydrogen formation system including a reactor 20 that can incorporate an ammonia decomposition catalyst system as described herein. In this embodiment, a hydrogen formation system can include an ammonia source 10 that can provide ammonia via a flow 1 to the reactor 20. The outflow from the reactor can include hydrogen flow 3 and nitrogen flow 6 either separated within the reactor, as shown, or combined in a single flow for optional separation downstream of the reactor. As shown, heat from the hydrogen flow 3 and the nitrogen flow 6 can be utilized in one embodiment to pre-heat the ammonia flow 1, e.g., via heat exchangers, as shown. The hydrogen outflow 3 can be pumped and collected 12, as shown, or optionally, directly fed to a downstream process, e.g., a fuel cell.

The ammonia flow 1 can enter the reactor so as to contact the catalyst system in any suitable fashion, e.g., in the form of a packed bed of particulate or in the form of a plurality of surfaces coated with the catalyst system. As the ammonia contacts the catalyst system, the ammonia can decompose to form hydrogen and nitrogen. The hydrogen and nitrogen can be separated within the reactor in one embodiment, for instance by use of a selective membrane 22, as is known in the art, that can be incorporated in the reactor. By way of example, a hydrogen selective polymer, ceramic or metal membrane 22, such as palladium or palladium-alloy membrane can be located within the reactor 20 so as to separate the product hydrogen flow 3 from the product nitrogen flow 6.

Disclosed catalyst systems, reactors, and reactor systems can efficiently and cost-effectively utilize an ammonia feed to provide hydrogen for any suitable application. For instance, hydrogen formed by use of the catalyst systems can be useful in any mobile electronic, auxiliary power utility, stationary electronic, or powertrain that can use hydrogen fuel as either its main power source as a backup power supply when disconnected from a grid. Disclosed methods and systems can also be used with metal ammine complexes that are used to safety transport ammonia. For example, after the ammonia is released from the metal ammines, it can be decomposed over disclosed catalyst systems to directly produce hydrogen.

The present disclosure may be better understood with reference to the Examples set forth below.

EXAMPLES

The catalyst systems in these examples were made using metal chlorides and potassium acetate (in those examples, incorporating a potassium promoter that was synthesized using the incipient wetness impregnated technique and supported on gamma-alumina. The catalysts were tested using a 16-channel high throughput reactor and the gas products were analyzed using FT-IR spectroscopy, were tested in a single channel reactor and analyzed with a mass spectrometer, and tested under different ammonia concentration, temperatures and pressures. Throughout these examples, the numbers in the catalyst label refer to the weight loadings of the metals in the system. For example, the catalyst 1,3 RuY contains 1 wt. % Ru and 3 wt. % Y. All catalyst systems included as support material Catalox® brand $\gamma$-$Al_2O_3$ (BET surface area: 192±12 $m^2$/g).

Example 1

A series of bimetallic catalyst components were formed including Ru and a secondary metal. Secondary metals included Fe, Ni, Co, Mn, Os, Zn, Mo, Rh, Pt, Hf, Ir, and Y. Materials were subjected to a high throughput screening at a temperature sweep from 250° C. to 450° C. in 1% $NH_3$ and compared to a benchmark catalyst system, 4 wt. % Ru on $\gamma$-$Al_2O_3$. Reaction conditions including pressure=1.0 bar, WHSV=53 $h^{-1}$, and 1% $NH_3$ in balance Ar.

Figure 2:
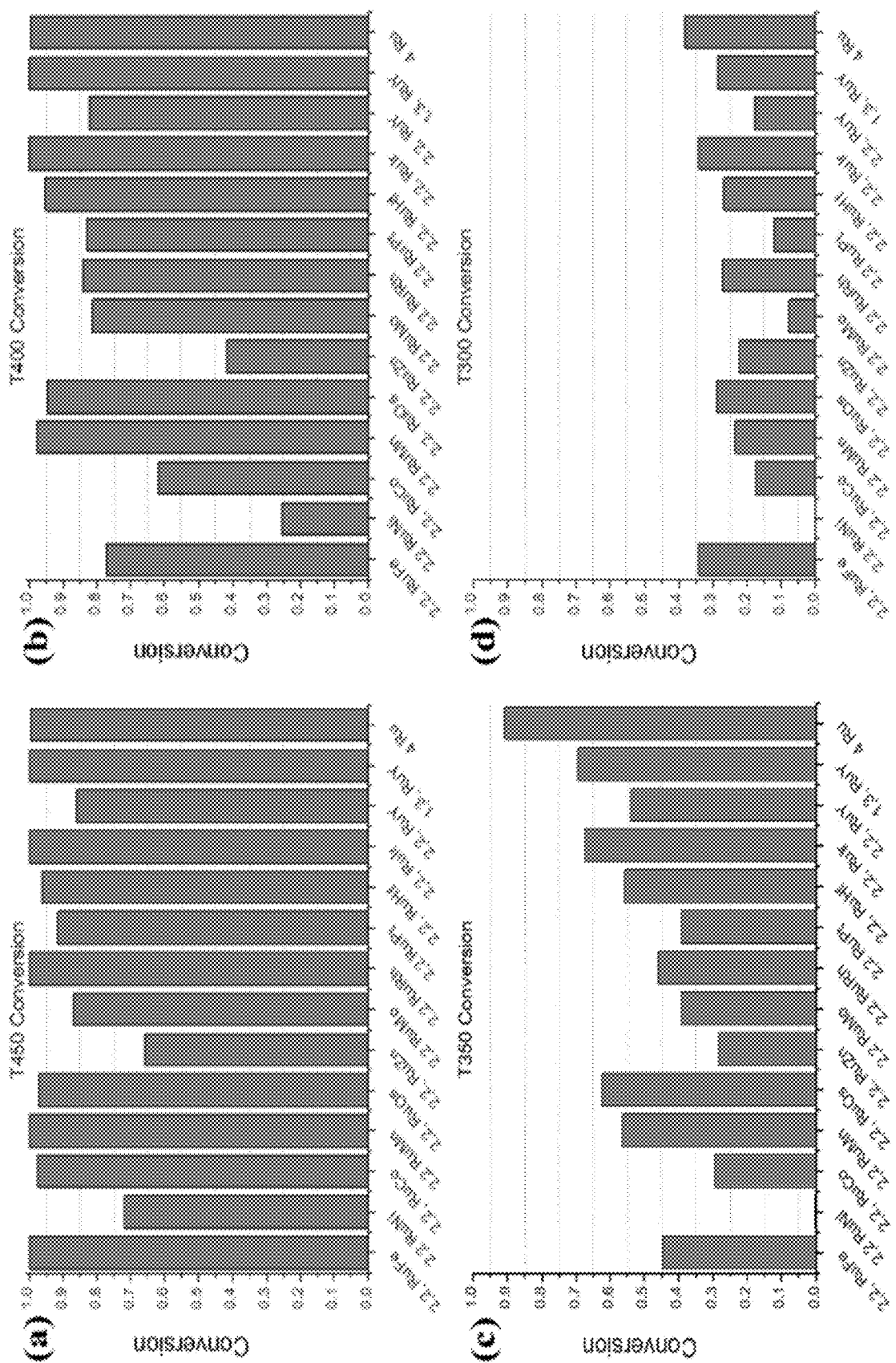
FIG. 2 presents $NH_3$ conversion amounts using catalysts as described at 450° C. (a), 400° C. (b), 350° C. (c), and 300° C. (d).

FIG. 2 presents conversion results for each of the substituted catalyst systems at 450° C. (a), 400° C. (b), 350° C. (c), and 300° C. (d), with the benchmark 4Ru catalyst system shown to the far right of each graph for comparison.

As shown, in general, these catalyst systems showed lower activity as compared to the benchmark. However, at reaction temperatures between 400° C. and 450°, it was found that many substituted compositions could compete with the benchmark catalyst system, including as 1,3 RuY, 2,2 RuMn, 2,2 RuFe, and 2,2 RuCo.

The most promising of these catalyst systems found through the high throughput screening were then tested in a single reactor system under higher $NH_3$ concentrations and pressures.

Figure 3:
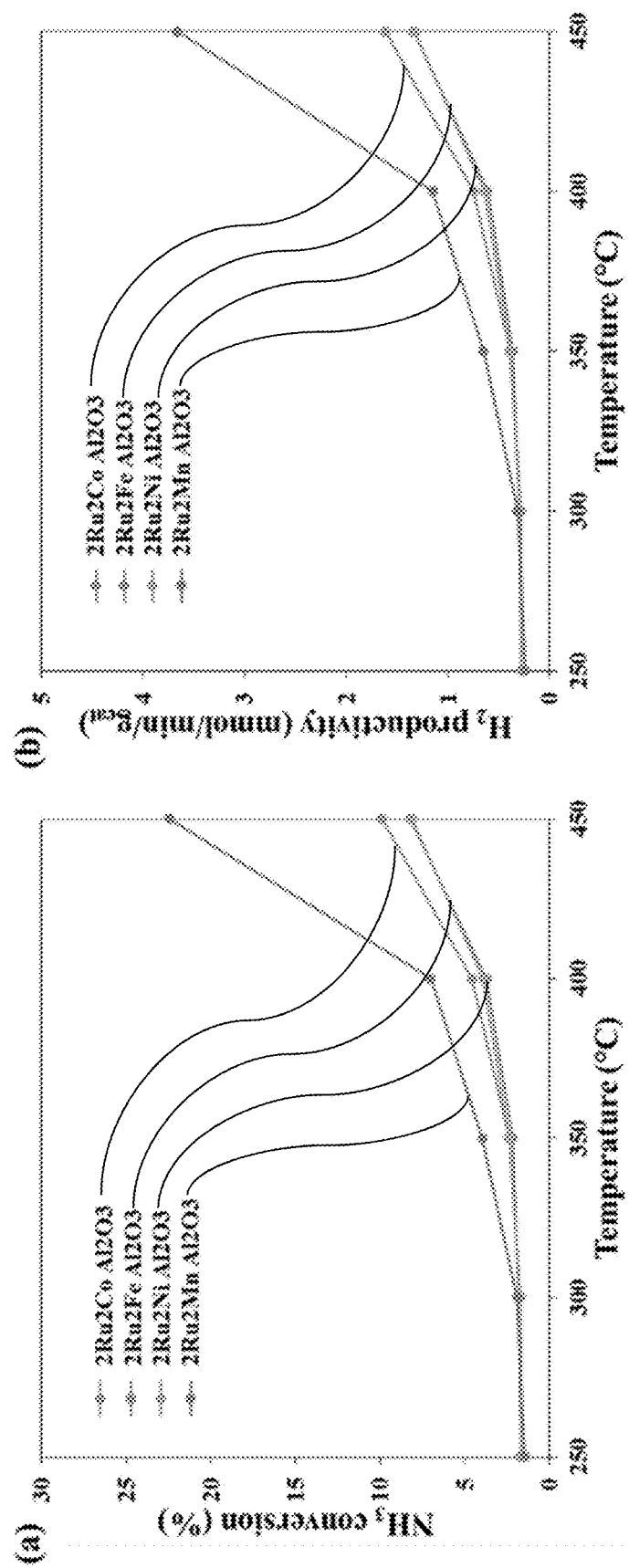
FIG. 3 presents the $NH_3$ conversion (a) and the $H_2$ production (b) for several bimetallic ruthenium-based catalysts described herein.

FIG. 3 illustrates the $NH_3$ conversion (a) and the $H_2$ productivity (b) of these selected catalyst systems including 2Ru2Co, 2Ru2Fe, 2Ru2Ni, and 2Ru2Mn. Among the substituted metal catalyst systems, the Mn substituted catalyst system performed very well, exhibiting 2× higher conversion than the other catalyst systems tested. The maximum conversion achieved of the tested materials was around 25% with a $H_2$ productivity close to 4 mmol $H_2$/min/g at 450° C. In these tests, reaction conditions, particularly the space velocity, were not optimized.

Example 2

Figure 4:
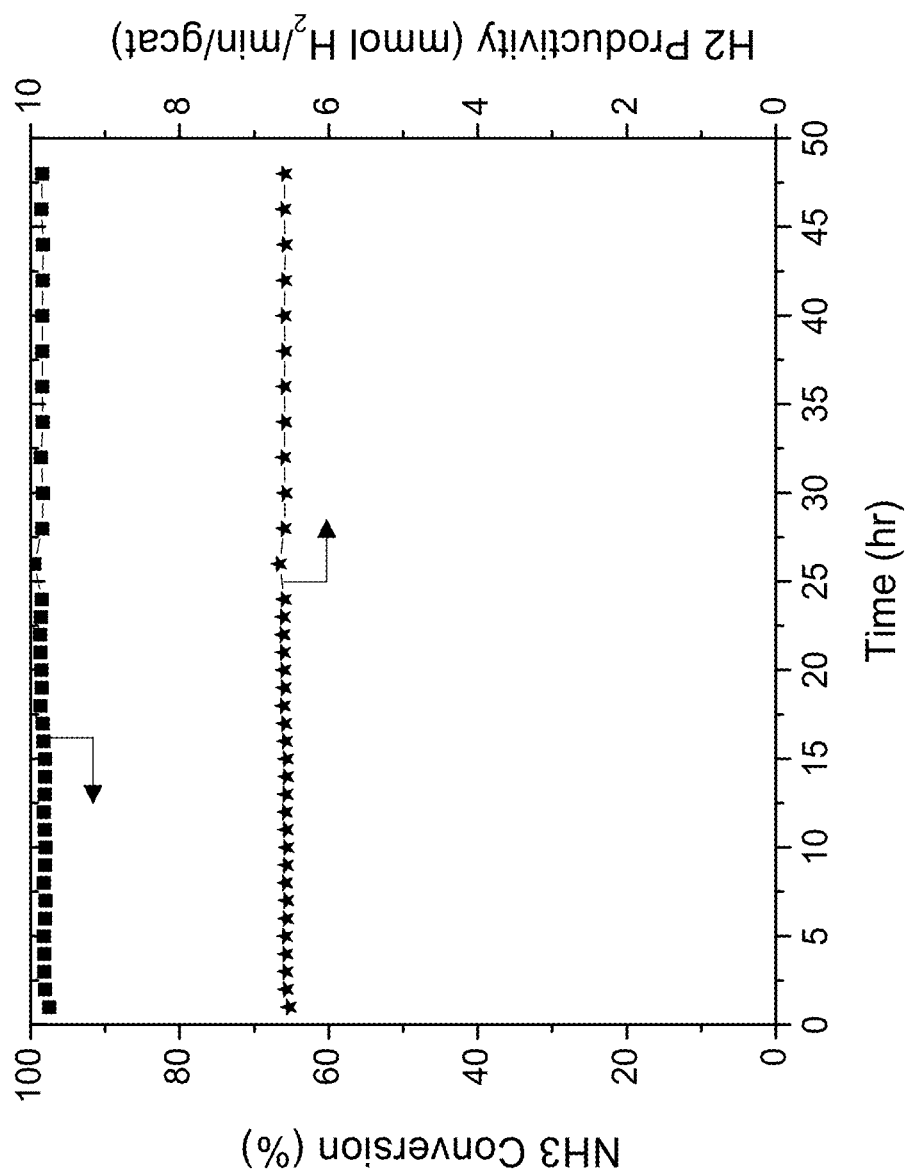
FIG. 4 presents the $NH_3$ conversion and the $H_2$ production for a tri-metallic ruthenium-based catalyst as described herein.

Another catalyst system was formed including 3 wt. % Ru, 1 wt. % Y, and 12 wt. % K. The catalyst system was tested over 48 hours. Results of $NH_3$ conversion and $H_2$ productivity are shown in FIG. 4. As shown, the catalyst system had a maximum conversion of 99.5% and a maximum hydrogen productivity rate of 6.6 mmol $H_2$/min/gcat. Reaction conditions were as follows: 100% $NH_3$, Pressure=5 bar, Temperature=400° C., WHSV=8 $hr^{-1}$

Example 3

Potassium promoted bimetallic catalyst systems were formed including 12 wt. % K, Ru and a secondary metal. The weight ratio of the Ru to the secondary metal was generally 75:25, 50:50, or 25:75, with one exception of 4Ru0.5Y12K. Secondary metals examined included Cu, Y, Mg, Mn, Ni, Cr, W, Ca, Hf, Sc, Rh, Zn, Sr, Bi, Pd, In, Mo, Ir, Re, Fe, and Co. Catalyst systems were examined according to a high throughput screening at a temperature sweep from 250° C. to 450° C. in 1% $NH_3$ and compared to a benchmark catalyst system, 4 wt. % Ru on $\gamma$-$Al_2O_3$. Reaction conditions included pressure=1.01 bar, 1% $NH_3$ in balance Ar, 200 mg catalyst, and 30,000 mL/$g_{cat}$-hr.

Figure 5:
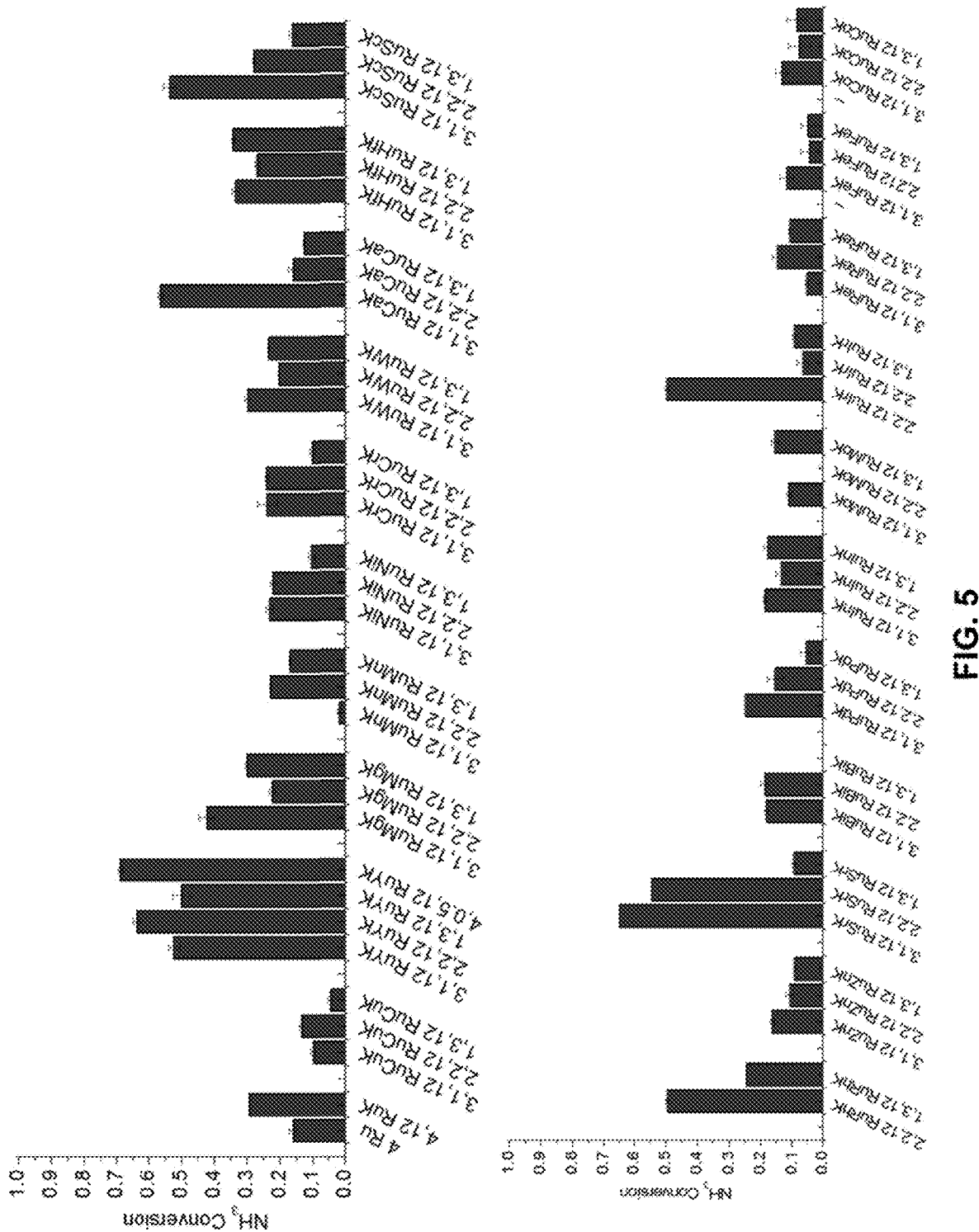
FIG. 5 presents $NH_3$ conversion data for potassium promoted ruthenium-based catalysts at 250° C. reaction conditions.
Figure 6:
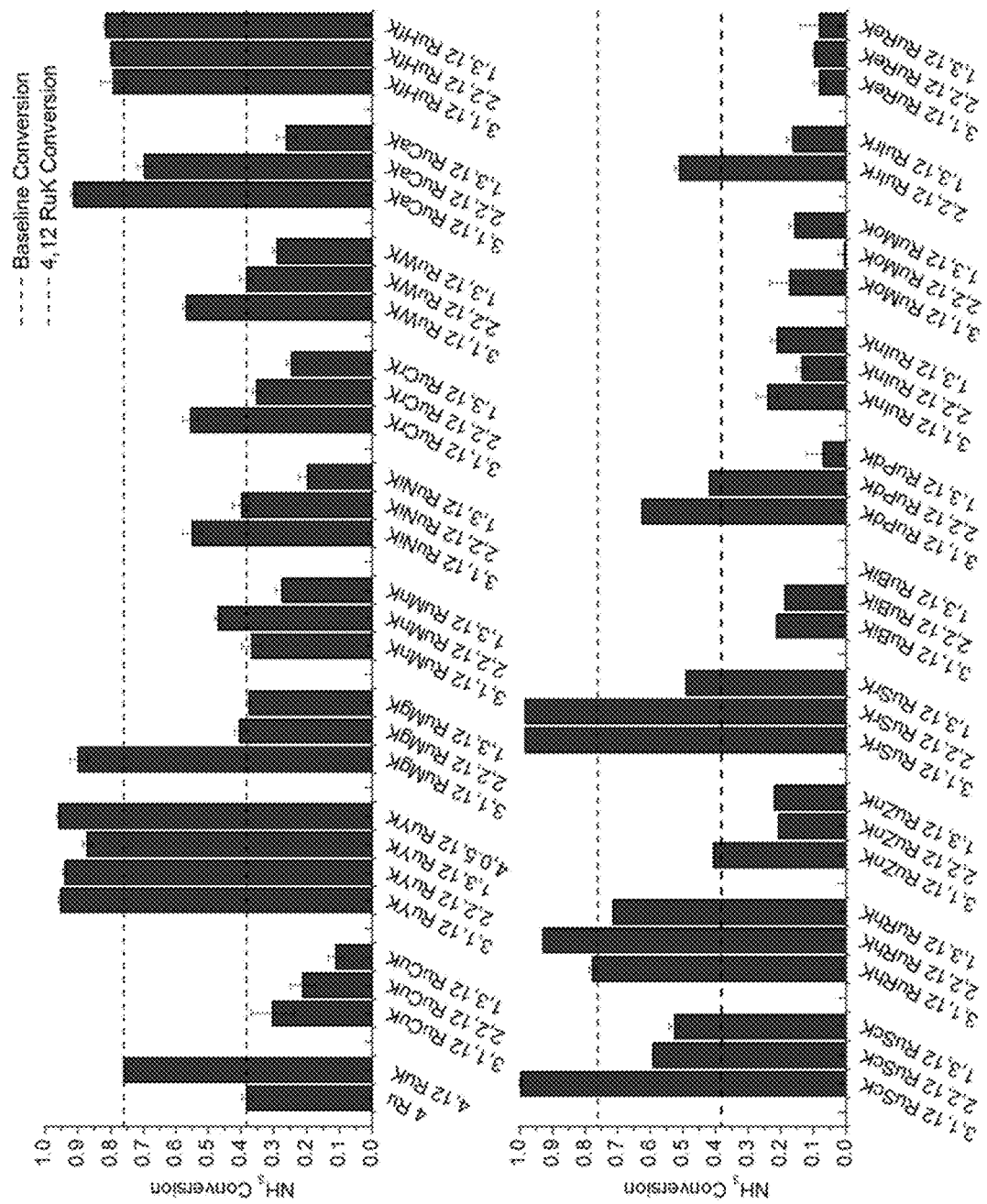
FIG. 6 presents $NH_3$ conversion data for potassium promoted ruthenium-based catalysts at 300° C. reaction conditions.
Figure 7:
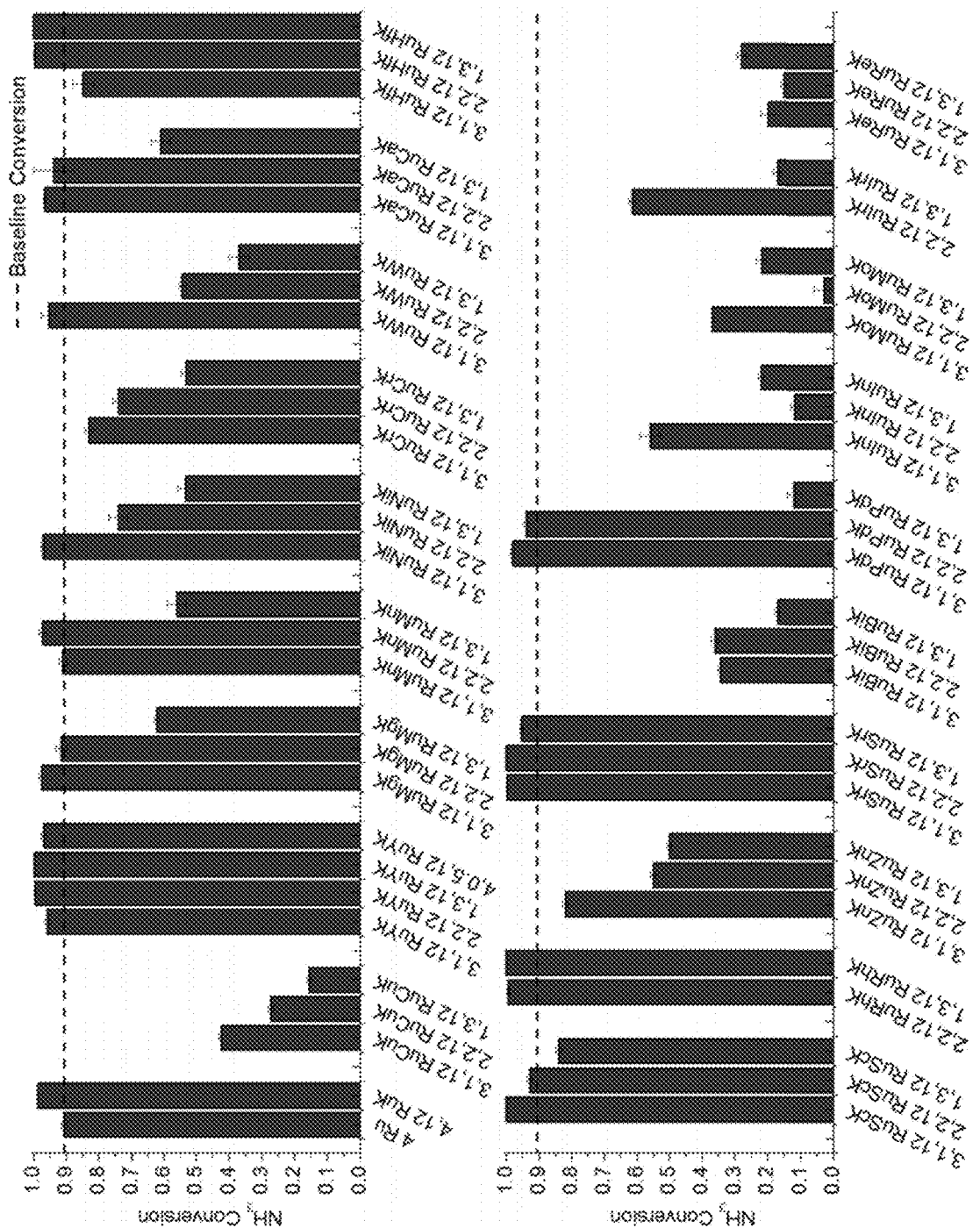
FIG. 7 presents $NH_3$ conversion data for potassium promoted ruthenium-based catalysts at 350° C. reaction conditions.
Figure 8:
FIG. 8 presents $NH_3$ conversion data for potassium promoted ruthenium-based catalysts at 400° C. reaction conditions.

Conversion results are shown in FIG. 5 (250° C.), FIG. 6 (300° C.), FIG. 7 (350° C.) and FIG. 8 (400° C.), which also compare the results for each catalyst system to an Ru catalyst system, including 12 wt. % K promoter.

Example 4

Figure 9:
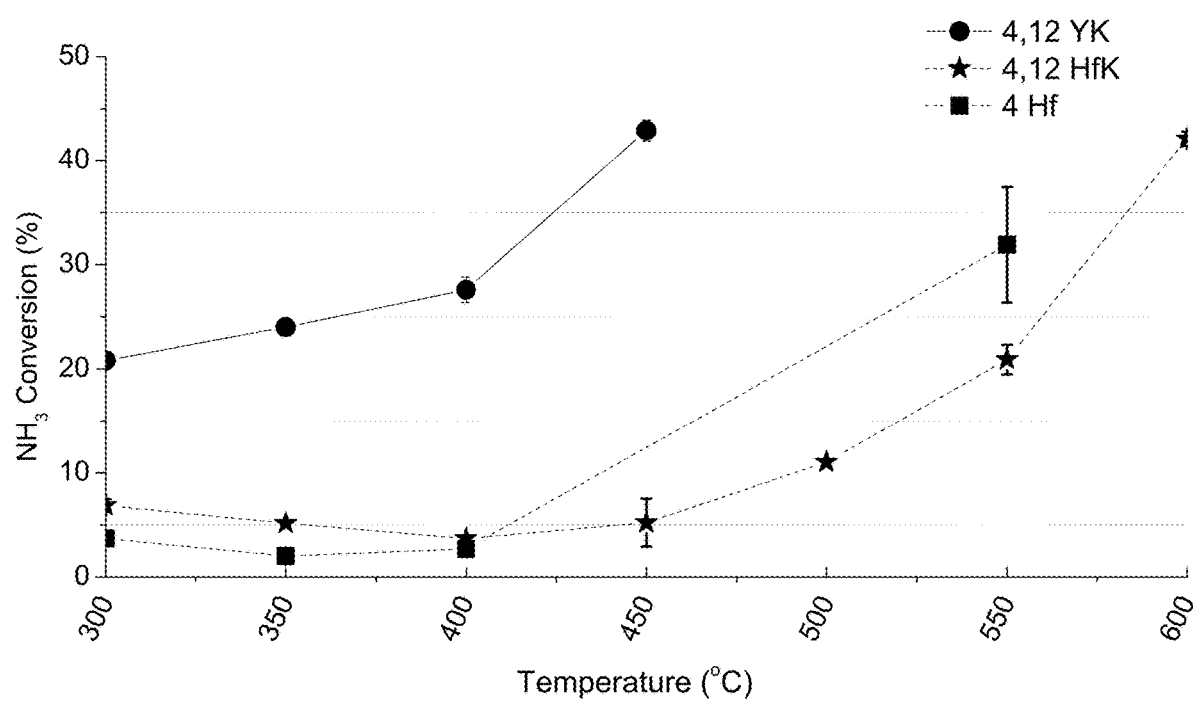
FIG. 9 presents $NH_3$ conversion data for hafnium and yttrium-based catalysts over a range of reaction temperatures.

Mono- and bimetallic catalyst systems were formed based on Hf and Y that were free of Ru. Catalyst systems formed included 4Y12K, 4Hf12K, and 4Hf. Catalyst systems were examined according to a high throughput screening at a temperature sweep from 300° C. to 600° C. in 10% $NH_3$. Reaction conditions included pressure=1.01 bar, 10% $NH_3$ in balance Ar, 200 mg catalyst, and 45,000 mL/$g_{cat}$-hr. Results are shown in FIG. 9.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming hydrogen, the method comprising:
   providing ammonia from an ammonia source to a first heat exchanger and pre-heating the ammonia in the first heat exchanger;
   feeding the ammonia that has been pre-heated to a reactor and contacting the ammonia with an ammonia decomposition catalyst system within the reactor at a reaction temperature of about 450° C. or lower to form a reaction product comprising hydrogen, wherein the catalyst system comprises a support material and a trimetallic catalyst component carried on the support material, wherein the trimetallic catalyst component includes no more than three metals and comprises a first metal being ruthenium, a second metal selected from the group consisting of magnesium, calcium, hafnium, scandium, rhenium, strontium, and yttrium, and a promoter comprising an alkali metal, wherein the ruthenium and the second metal are present in a weight ratio to one another of from about 8:1 to about 1:8, wherein the ruthenium is present in an amount of less than 4 wt. % of the catalyst system and the promoter is present in an amount of from about 5 wt. % to about 20 wt. % of the catalyst system; and separating the hydrogen from the reaction product using a hydrogen selective membrane fluidly connected to the catalyst system.

2. The method of claim 1, wherein the promoter is a single metal selected from the group consisting of sodium, potassium, rubidium, and cesium.

3. The method of claim 1, wherein the support material comprises an inorganic oxide.

4. The method of claim 1, wherein the second metal is hafnium.

5. The method of claim 1, wherein the second metal is yttrium.

6. The method of claim 1, wherein the catalyst system comprises the promoter in an amount of from about 8 wt. % to about 15 wt. % of the catalyst system.

7. The method of claim 1, wherein the catalyst system comprises the ruthenium in an amount of 3 wt. % or less.

8. The method of claim 1, wherein the catalyst system comprises the ruthenium in an amount of 2 wt. % or less.

9. The method of claim 1, wherein the catalyst system comprises the ruthenium in an amount of 1 wt. % or less.

10. The method of claim 1, wherein the promoter is potassium.

11. The method of claim 1, wherein the contacting is carried out at a pressure of from about 1 bar to about 5 bar.

12. The method of claim 1, further comprising feeding the hydrogen from a first side of the hydrogen selective membrane to a hydrogen collection tank fluidly connected to the first side of the hydrogen selective membrane.

13. The method of claim 1, further comprising feeding the hydrogen from a first side of the hydrogen membrane to a fuel cell fluidly connected to the first side of the hydrogen selective membrane.

14. The method of claim 1, further comprising pre-heating the ammonia in a second heat exchanger between the ammonia source and the reactor and configured to heat the ammonia.

* * * * *